9055X
J. Herman,
Bench Plane.
Patented Aug 27. 1835.
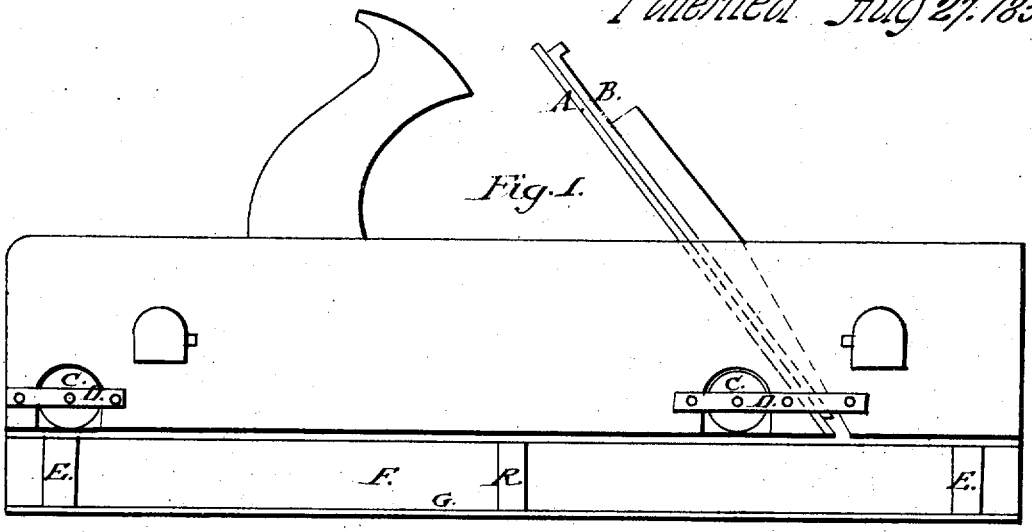
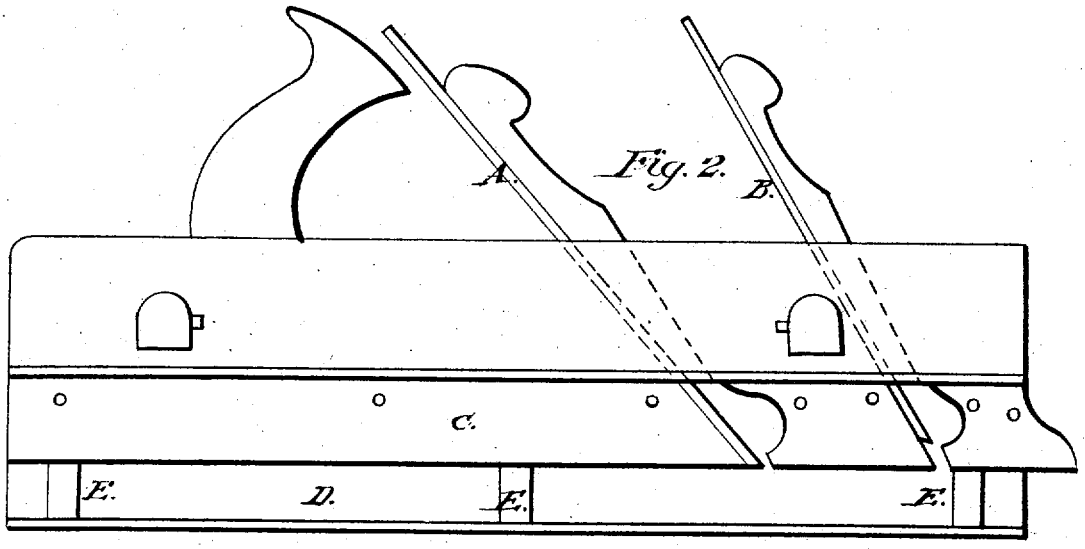
N. PETERS, PHOTO-LITHOGRAPHER, WASHINGTON, D. C.

9055X 121.

Aug. 27 1835

James Herman of Lancaster Ohio.

Letters Patent.

The Schedule referred to in these Letters Patent, and making part of the same, containing a description in the words of the said James Herman, himself of his Improvements in the making of grooving planes called the roller grooving planes for flooring and other purposes.

To all persons to whom these presents shall come.
James Herman of the town of Lancaster County of Fairfield in the State of Ohio. Sends Greeting. Be it known that I the said James Herman, have invented a new and useful improvement not known or used before in the makeing or manufacturing of the grooving planes used by carpenters and house joiners which invention, and the manner of using it is as follows. This improve-ment in the usual grooving planes consists in having two or more metal rollers in the in the face of the tongueing plane and also two or more rollers in the faces of each of the fences of both tounging plane and groove to run in metal boxes on pivots or gudgeons, and also the addition of two extra bits for the purpose of chamfering the corners of the tounge, and also the groove, one of the extra bitts is placed on the toungeing bitt in the manner of the cap on a double bitt, the other extra bitt in the grooving plane is placed in front of the grooving bitt between the grooving bitt and the forward end of the plane (for further see drawing accompanying this) In witness whereof I have hereunto subscribed my name this 9th day of May A D. 1835

Witnesses

Jacob D. Dietrich

Joel M. Gallagher

James Herman

Exd [illegible]

280 words (Patented Aug. 27 1835)

Drawing